US012165586B2

(12) United States Patent
Lee et al.

(10) Patent No.: US 12,165,586 B2
(45) Date of Patent: Dec. 10, 2024

(54) DISPLAY DEVICE

(71) Applicant: Samsung Display Co., LTD., Yongin-si (KR)

(72) Inventors: Sukhun Lee, Yongin-si (KR); Bon-Seog Gu, Yongin-si (KR); Hongsoo Kim, Yongin-si (KR); Myungwoo Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/234,105

(22) Filed: Aug. 15, 2023

(65) Prior Publication Data

US 2024/0119896 A1 Apr. 11, 2024

(30) Foreign Application Priority Data

Oct. 6, 2022 (KR) ........................ 10-2022-0127637

(51) Int. Cl.
*G09G 3/3233* (2016.01)

(52) U.S. Cl.
CPC ... *G09G 3/3233* (2013.01); *G09G 2300/0426* (2013.01); *G09G 2330/021* (2013.01)

(58) Field of Classification Search
CPC ......... G09G 3/3233; G09G 2300/0426; G09G 2330/021
See application file for complete search history.

(56) References Cited

U.S. PATENT DOCUMENTS 11,017,720 B2 5/2021 Chai et al.
11,211,003 B2 12/2021 Seo et al.
11,263,976 B2 3/2022 Yang et al.
2019/0148477 A1* 5/2019 Park .................... G09G 3/3233 257/40
2019/0164492 A1* 5/2019 Oh ....................... G09G 3/3258
2019/0164494 A1* 5/2019 Bae ...................... G09G 3/3258
2020/0066207 A1* 2/2020 Gu ....................... G09G 3/3275
2020/0211449 A1* 7/2020 Kim ......................... G09G 3/32
2020/0394961 A1* 12/2020 Kim .................... G09G 3/3233
2022/0044628 A1* 2/2022 Li ........................ G09G 3/3208

FOREIGN PATENT DOCUMENTS

KR 20180063425 A 6/2018
KR 20200030431 A 3/2020
KR 20200032303 A 3/2020

* cited by examiner

*Primary Examiner* — Premal R Patel
(74) *Attorney, Agent, or Firm* — CANTOR COLBURN LLP

(57) ABSTRACT

A display device includes a display panel including a plurality of pixels and that displays an image in each of a plurality of frames, a driving controller that drives the plurality of frames with a plurality of driving frequencies, respectively, and a voltage controller that provides a first voltage and a second voltage, and the driving controller drives one of the plurality of frames with a first driving frequency and drives another one of the plurality of frames with a second driving frequency, and the voltage controller provides the second voltage to be repeated in a first period in the one of the plurality of frames and provides the second voltage to be repeated in a second period in the another one of the plurality of frames.

19 Claims, 8 Drawing Sheets

DISPLAY DEVICE

This application claims priority to Korean Patent Application No. 10-2022-0127637, filed on Oct. 6, 2022, and all the benefits accruing therefrom under 35 U.S.C. § 119, the content of which in its entirety is herein incorporated by reference.

BACKGROUND

1. Field

Embodiments of the disclosure described herein relate to a display device with improved display quality.

2. Description of the Related Art

There are being developed various display devices such as a television, a mobile phone, a tablet computer, a navigation system, or a game console. In particular, since portable display devices operate by batteries, various efforts are being made to reduce power consumption.

As a resolution of display devices increases, an amount of driving current that can be supplied to each organic light-emitting diode is limited, and thus display defects may occur.

SUMMARY

Embodiments of the disclosure provide a display device with improved display quality.

In an embodiment of the disclosure, a display device includes a display panel including a plurality of pixels and that displays an image in each of a plurality of frames, a driving controller that drives the plurality of frames with a plurality of driving frequencies, respectively, and a voltage controller that provides a first voltage, a high level, and a second voltage in which a low level having a voltage level different from the high level is repeated at a predetermined period to the display panel, and the driving controller drives one of the plurality of frames with a first driving frequency and drives another one of the plurality of frames with a second driving frequency, and the voltage controller provides the second voltage to be repeated in a first period in the one of the plurality of frames and provides the second voltage to be repeated in a second period having a longer width than a width of the first period in the another one of the plurality of frames.

In an embodiment, each of the plurality of pixels may include a first transistor including a gate electrode connected to a first node, a first electrode connected to a first voltage line to which the first voltage is provided, and a second electrode connected to a second node, a second transistor including a gate electrode connected to a first scan line, a first electrode connected to the first node, and a second electrode connected to a third node, a first capacitor connected between the first node and an initialization voltage line, a third transistor including a gate electrode connected to a second scan line, a first electrode connected to the third node, and a second electrode connected to the second node, a second capacitor connected between the third node and a data line, and a light-emitting diode including a first electrode connected to the second node and a second electrode connected to a second voltage line to which the second voltage is provided.

In an embodiment, a first luminance of light emitted from the light-emitting diode in the one of the plurality of frames may be higher than a second luminance of light emitted from the light-emitting diode in the another one of the plurality of frames.

In an embodiment, a first emission time of light emitted from the light-emitting diode in the one of the plurality of frames may be shorter than a second emission time of light emitted from the light-emitting diode in the another one of the plurality of frames.

In an embodiment, the first driving frequency may be higher than the second driving frequency.

In an embodiment, the display device may further include a data driver electrically connected to the display panel, and the display panel may further include a plurality of data lines respectively connected to a plurality of pixels, and the data driver simultaneously may provide data voltages generated in units of pixel rows to a plurality of pixels through the plurality of data lines.

In an embodiment, a first height between a high level and a low level of a data voltage of the data voltages provided to the one of the plurality of frames may be greater than a second height between the high level and the low level of the data voltage provided to the another one of the plurality of frames.

In an embodiment, when the second driving frequency is 1/n times the first driving frequency, the low level of the second voltage may be repeated by a natural number of n−1 or less during a frame driven at the second driving frequency.

In an embodiment, the high level may be equal to or greater than a voltage level of a low level of the first voltage.

In an embodiment, the low level may be less than a voltage level of a high level of the first voltage.

In an embodiment, a first height between the high level and the low level of the second voltage in the one of the plurality of frames may be greater than a second height between the high level and the low level of the second voltage in the another one of the plurality of frames.

In an embodiment, a first voltage level of the low level of the second voltage in the one of the plurality of frames may be less than a second voltage level of the low level of the second voltage in the another one of the plurality of frames.

In an embodiment, a first width of a period in which the low level of the second voltage is provided in the one of the plurality of frames may be less than a second width of a period in which the low level of the second voltage is provided in the another one of the plurality of frames.

In an embodiment of the disclosure, a display device includes a display panel including a plurality of pixels, and each of the plurality of pixels includes a first transistor including a gate electrode connected to a first node, a first electrode connected to a first voltage line to which a first voltage is provided, and a second electrode connected to a second node, a second transistor including a gate electrode connected to a first scan line, a first electrode connected to the first node, and a second electrode connected to a third node, a first capacitor connected between the first node and an initialization voltage line, a third transistor including a gate electrode connected to a second scan line, a first electrode connected to the third node, and a second electrode connected to the second node, a second capacitor connected between the third node and a data line, and a light-emitting diode including a first electrode connected to the second node and a second electrode connected to a second voltage line to which a second voltage in which a high level and a low level having a voltage level different from the high level are repeated in a predetermined period is provided. The display panel displays an image in each of a plurality of frames respectively driven at a plurality of driving frequencies, and the second voltage is provided such that a high level and a low level are repeated in a first period in a first frame operating at a first driving frequency among the plurality of frames, and is provided such that the high level and the low level are repeated in a second period having a longer width than the first period in a second frame operating at a second driving frequency lower than the first driving frequency among the plurality of frames.

In an embodiment, a first luminance of light emitted from the light-emitting diode in the first frame may be higher than a second luminance of light emitted from the light-emitting diode in the second frame.

In an embodiment, a first emission time of light emitted from the light-emitting diode in the first frame may be shorter than a second emission time of light emitted from the light-emitting diode in the second frame.

In an embodiment, a first height between the high level and the low level of the second voltage in the first frame may be greater than a second height between the high level and the low level of the second voltage in the second frame.

In an embodiment, a first voltage level of the low level of the second voltage in the first frame may be less than a second voltage level of the low level of the second voltage in the second frame.

In an embodiment, a first width of a period in which the low level of the second voltage is provided in first frame may be less than a second width of a period in which the low level of the second voltage is provided in the second frame.

In an embodiment, when the second driving frequency is 1/n times the first driving frequency, the low level of the second voltage may be repeated by a natural number of n−1 or less during the second frame.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
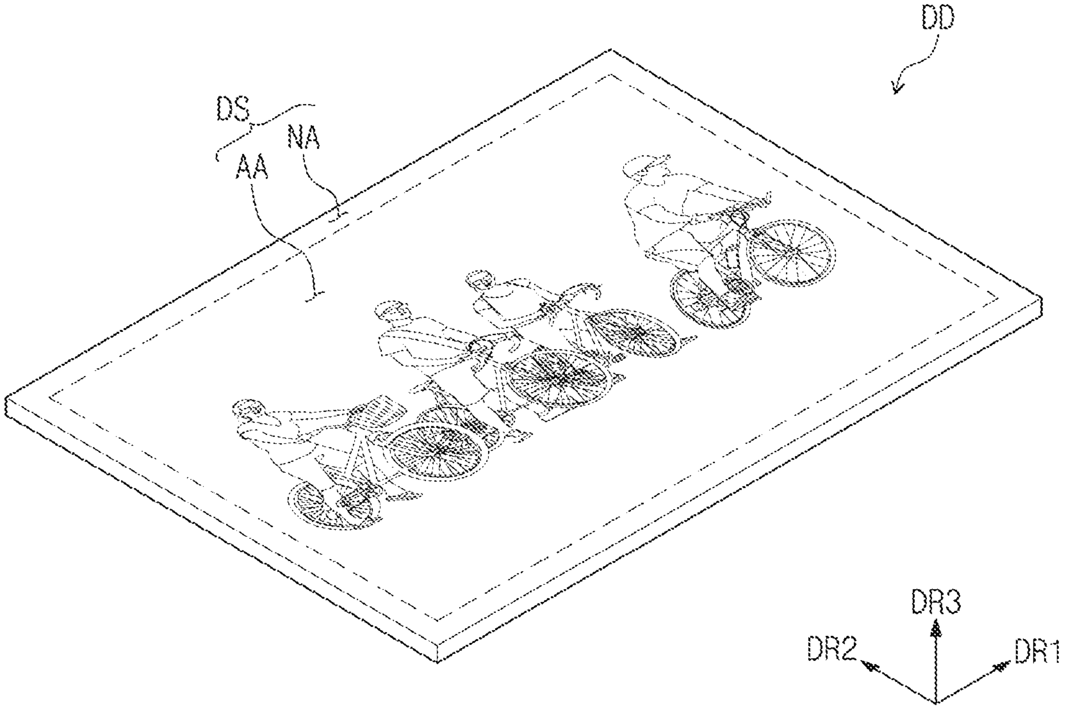
FIG. 1 is a perspective view illustrating an embodiment of a display device according to the disclosure.

In the specification, when one component (or area, layer, part, or the like) is also referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or any combinations thereof, not precluding the presence or additional possibility of one or more other features, numbers, steps, operations, elements, or components or any combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the disclosure.

Hereinafter, embodiments of the disclosure will be described with reference to accompanying drawings.

FIG. 1 is a perspective view of an embodiment of a display device according to the disclosure.

Referring to FIG. 1, a display device DD may have a plane defined by a first direction DR1 and a second direction DR2 crossing the first direction DR1. The display device DD may have a quadrangular shape, e.g., rectangular shape with long sides extending in the first direction DR1 and short sides extending in the second direction DR2. However, this is an example and a shape of the display device DD in an embodiment of the disclosure is not limited thereto. In an embodiment, the display device DD may have various shapes such as a circle or a polygon, for example.

An upper surface of the display device DD may be defined as a display surface DS. The display surface DS may have a plane defined by the first and second directions DR1 and DR2. An image generated on the display device DD may be provided to a user through the display surface DS.

The display surface DS may include an active area AA and a peripheral area NA adjacent to the active area AA.

The active area AA may display the image. A third direction DR3 may indicate the normal direction of the active area AA, that is, a thickness direction of the display device DD. The front surface (or upper surface) and rear surface (or lower surface) of each member may be divided by the third direction DR3. "On a plane" may mean viewing based on the third direction DR3.

The peripheral area NA may not display the image. The peripheral area NA surrounds the active area AA and may define an edge of the display device DD printed in a predetermined color. However, it is not limited thereto, and the shape of the active area AA and the shape of the peripheral area NA may be relatively designed. In an embodiment of the disclosure, the peripheral area NA may be omitted.

The display device DD may be used for large display devices such as televisions, monitors, or external billboards. Also, the display device DD may be used in small and medium-sized display devices such as a personal computer, a notebook computer, a personal digital terminal, a car navigation system, a game console, a smart phone, a tablet, or a camera. However, these are presented in an embodiment only, and may be used in other electronic devices without departing from the concept of the disclosure.

Figure 2:
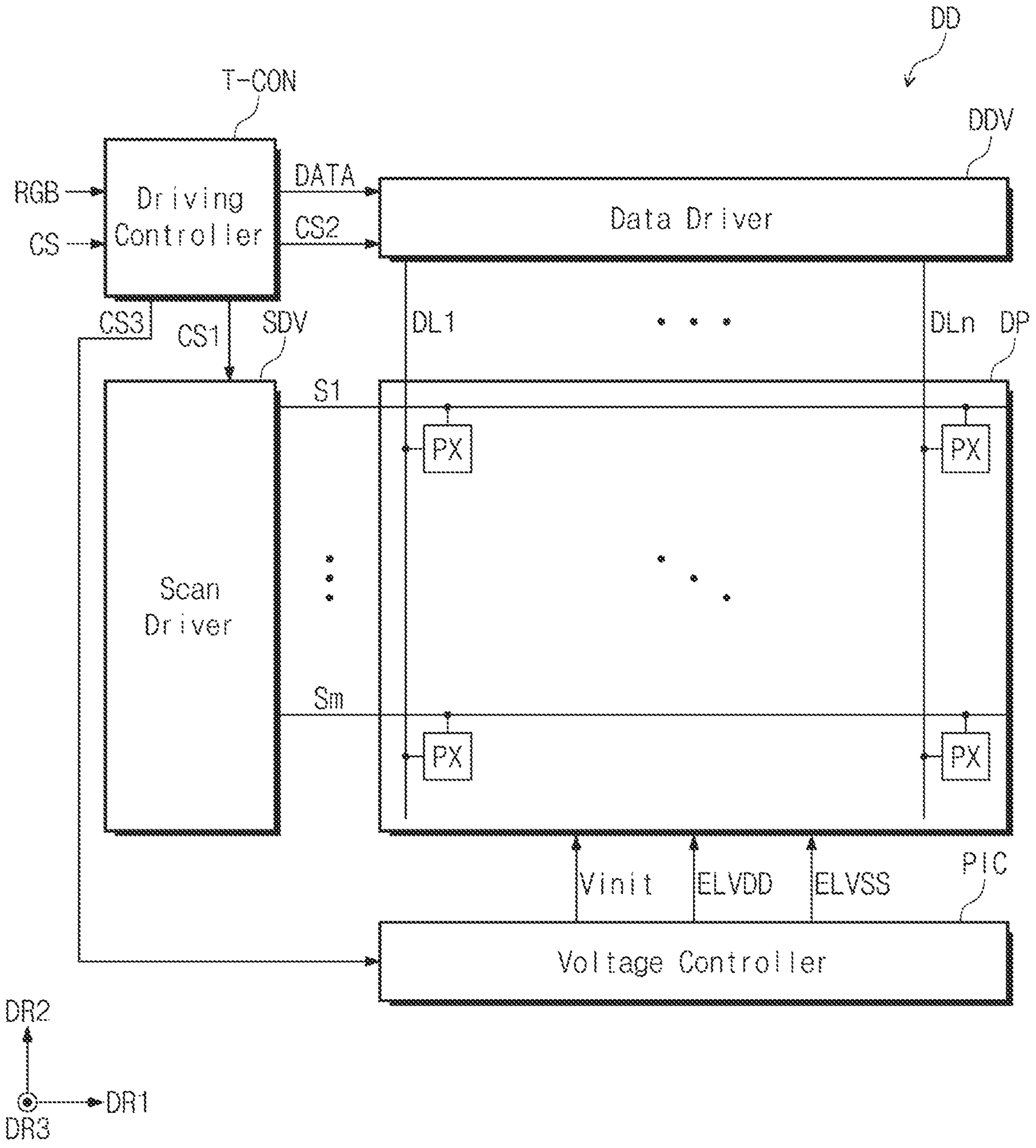
FIG. 2 is a block diagram of an embodiment of a display device according to the disclosure.

FIG. 2 is a block diagram of an embodiment of a display device according to the disclosure.

Referring to FIG. 2, the display device DD may include a display panel DP, a voltage controller PIC, a scan driver SDV, a data driver DDV, and a driving controller T-CON. The display panel DP may include a plurality of pixels PX, a plurality of scan lines S1 to Sm, and a plurality of data lines DL1 to DLn. Here, 'm' and 'n' are each a natural number.

The display panel DP in an embodiment may be a light-emitting display panel, and is not particularly limited thereto. In an embodiment, the display panel DP may be an organic light-emitting display panel, an inorganic light-emitting display panel, a micro light-emitting diode ("LED") display panel, or a nano LED display panel, for example. A light-emitting device of the organic light-emitting display panel may include an organic light-emitting material. A light-emitting device of the inorganic light-emitting display panel may include a quantum dot, a quantum rod, etc. A light-emitting device of the micro LED display panel may include a micro LED. A light-emitting device of the nano-LED display panel may include a nano-LED.

The plurality of scan lines S1 to Sm may be connected to the plurality of pixels PX and the scan driver SDV. Each of the plurality of scan lines S1 to Sm may extend in the first direction DR1. The plurality of scan lines S1 to Sm may be spaced apart from each other in the second direction DR2.

The plurality of data lines DL1 to DLn may be connected to the plurality of pixels PX and the data driver DDV. Each of the plurality of data lines DL1 to DLn may extend in the second direction DR2. The plurality of data lines DL1 to DLn may be spaced apart from each other in the first direction DR1.

The voltage controller PIC may generate and control power and/or common power provided to the display panel DP. The voltage controller PIC may include a power management integrated circuit ("PMIC"). The voltage controller PIC may generate and control a first voltage ELVDD, a second voltage ELVSS, and an initialization voltage Vinit.

The first voltage ELVDD, the second voltage ELVSS, and the initialization voltage Vinit may be applied to the display panel DP. The second voltage ELVSS may have a lower level than the first voltage ELVDD. The first voltage ELVDD, the second voltage ELVSS, and the initialization voltage Vinit may be applied to the plurality of pixels PX.

The driving controller T-CON may receive image signals RGB and a control signal CS from an outside (e.g., a system board). The driving controller T-CON may generate image data DATA by converting a data format of the image signals RGB to meet the specifications of the interface with the data driver DDV. The driving controller T-CON may provide the image data DATA of which data format is converted to the data driver DDV.

The driving controller T-CON may generate and output a first control signal CS1 and a second control signal CS2 in response to the control signal CS provided from the outside. The first control signal CS1 may be defined as a scan control signal, and the second control signal CS2 may be defined as a data control signal. The first control signal CS1 may be provided to the scan driver SDV. The second control signal CS2 may be provided to the data driver DDV.

The scan driver SDV may generate a plurality of scan signals in response to the first control signal CS1. The plurality of scan signals may be applied to the plurality of pixels PX through the plurality of scan lines S1 to Sm.

The data driver DDV may generate a plurality of data voltages corresponding to the image data DATA in response to the second control signal CS2. The plurality of data voltages may be applied to the plurality of pixels PX through the data lines DL1 to DLn. The data driver DDV may simultaneously provide the data voltages generated in units of pixel rows to the plurality of pixels PX through the data lines DL1 to DLn.

The plurality of pixels PX may receive the plurality of data voltages in response to the plurality of scan signals. The plurality of pixels PX may display an image by emitting light having luminance corresponding to the plurality of data voltages. The plurality of pixels PX may simultaneously emit light to display the image.

Figure 3:
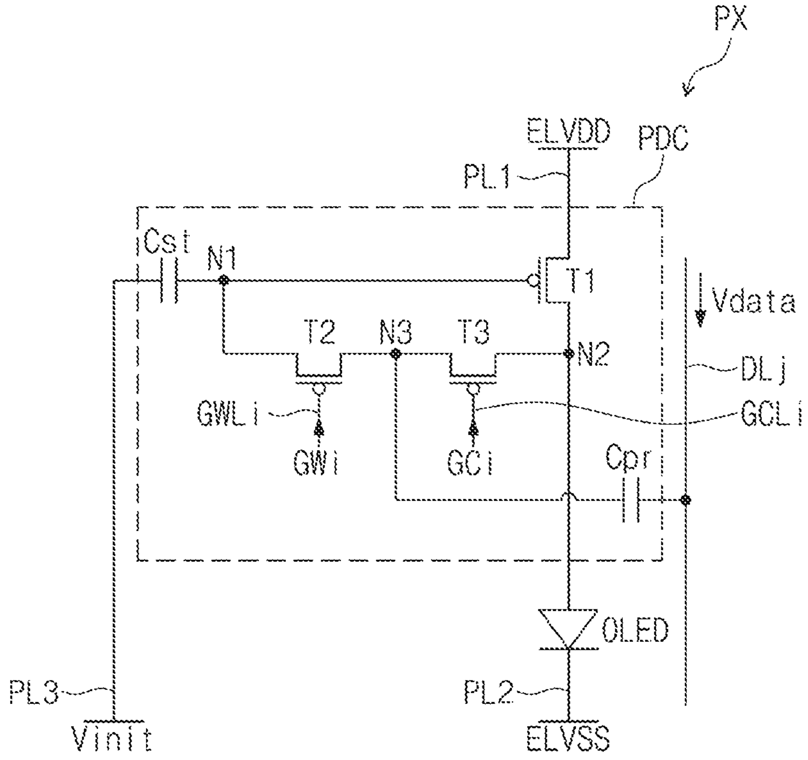
FIG. 3 is an equivalent circuit diagram of an embodiment of a pixel according to the disclosure.

FIG. 3 is an equivalent circuit diagram of an embodiment of a pixel according to the disclosure.

Referring to FIG. 3, a pixel PX may include a pixel circuit PDC and a light-emitting diode OLED. The pixel circuit PDC may include a first transistor T1, a second transistor T2, a third transistor T3, a first capacitor Cst, and a second capacitor Cpr. The pixel PX in an embodiment of the disclosure may be also referred to as having a 3T2C structure including three transistors and two capacitors.

The pixel PX may be a pixel connected to an i-th scan line among the plurality of scan lines S1 to Sm (refer to FIG. 2) and a j-th data line DLj among the plurality of data lines DL1 to DLn. Each of 'i' and 'j' may be a natural number. The i-th scan line may include a first scan line GWLi and a second scan line GCLi.

Each of the first to third transistors T1, T2, and T3 may be a P-type transistor having a low-temperature polycrystalline silicon ("LTPS") semiconductor layer. However, this is an example, and all of the first to third transistors T1, T2, and T3 in an embodiment of the disclosure may be N-type transistors, and in some embodiments, at least one of the first to third transistors T1, T2, and T3 may be a P-type transistor, and the others may be N-type transistors.

The scan lines GWLi and GCLi may transfer scan signals GWi and GCi, respectively. The data line DLj may transfer a data voltage Vdata. The data voltage Vdata may have a voltage level corresponding to the image signal RGB (refer to FIG. 2) input to the display device DD (refer to FIG. 1). A first voltage line PL1 may transfer the first voltage ELVDD. A second voltage line PL2 may transfer the second voltage ELVSS. An initialization voltage line PL3 may transfer the initialization voltage Vinit.

The first transistor T1 may have a gate electrode connected to a first node N1, a first electrode connected to the first voltage line PL1, and a second electrode connected to a second node N2. The first transistor T1 may be also referred to as a driving transistor.

The second transistor T2 may have a gate electrode connected to the first scan line GWLi, a first electrode connected to the first node N1, and a second electrode connected to a third node N3. The second transistor T2 may be also referred to as a switching transistor or a scan transistor.

The third transistor T3 may have a gate electrode connected to the second scan line GCLi, a first electrode connected to the third node N3, and a second electrode connected to the second node N2. The third transistor T3 may be also referred to as an initialization transistor.

The first capacitor Cst may have a first electrode connected to the first node N1 and a second electrode connected to the initialization voltage line PL3. The first capacitor Cst may be also referred to as a storage capacitor.

The second capacitor Cpr may have a first electrode connected to the third node N3 and a second electrode connected to the data line DLj.

The light-emitting diode OLED may have a first electrode connected to the second node N2 and a second electrode connected to the second voltage line PL2. The first electrode of the light-emitting diode OLED may be also referred to as an anode electrode, and the second electrode of the light-emitting diode OLED may be also referred to as a cathode electrode.

The first voltage ELVDD may be provided to the first voltage line PL1. The second voltage ELVSS may be provided to the second voltage line PL2. The initialization voltage Vinit may be provided to the initialization voltage line PL3.

Figure 4:
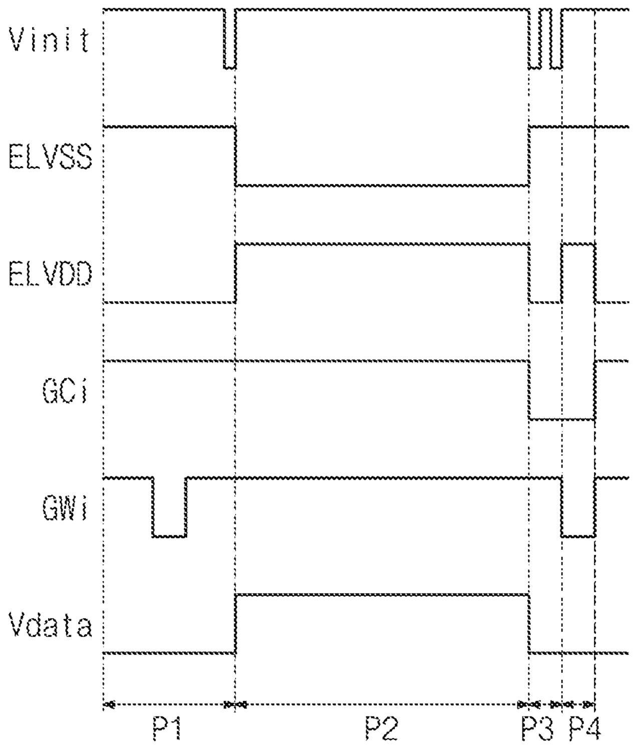
FIG. 4 is a timing diagram of an embodiment of signals according to the disclosure.

FIG. 4 is a timing diagram of an embodiment of signals according to the disclosure, and FIGS. 5A to 5D are diagrams for describing an embodiment of an operation of a pixel according to the disclosure. In the description of FIGS. 5A to 5D, the same reference numerals are given to the same components as those in FIG. 3, and additional descriptions thereof are omitted to avoid redundancy.

Figure 5A:
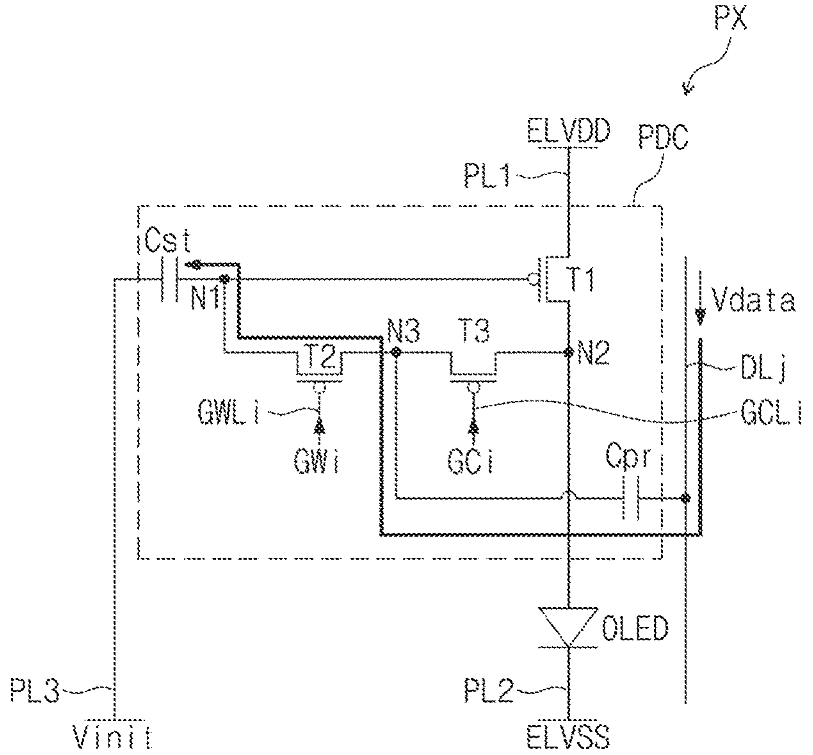
FIGS. 5A to 5D are diagrams for describing an embodiment of an operation of a pixel according to the disclosure.

FIG. 5A is a diagram for describing an operation of the pixel PX in a first period P1.

Referring to FIGS. 4 and 5A, a driving period may include first to fourth periods P1, P2, P3, and P4.

In the first period P1, the data voltage Vdata and the first scan signal GWi may be at an active level. An active level of the data voltage Vdata may be a low level. An active level of the first scan signal GWi may be a low level.

The first voltage ELVDD, the second voltage ELVSS, and the second scan signal GCi may be at an inactive level. An inactive level of the first voltage ELVDD may be a low level. An inactive level of the second voltage ELVSS may be a high level. An inactive level of the second scan signal GCi may be a high level.

During the first period P1, the first scan signal GWi of the active level may be sequentially provided to the plurality of scan lines S1 to Sm (refer to FIG. 2). Also, data voltages synchronized with the first scan signal GWi may be provided to the data line DLj.

In the first period P1, the data voltage Vdata may be provided to the first capacitor Cst through the third node N3, the turned-on second transistor T2, and the first node N1.

The first period P1 may be also referred to as a programming period or a data writing period.

At the end of the first period P1, the initialization voltage Vinit may change from a high level to a low level. While a voltage of the first node N1 capacitively coupled through the initialization voltage line PL3 and the first capacitor Cst falls, the first transistor T1 may be turned on. In this case, the first voltage ELVDD may be at a low level, and the second voltage ELVSS may be at a high level. Accordingly, the capacitor of the light-emitting diode OLED may be initialized while the light-emitting diode OLED does not emit light. A capacitor of the light-emitting diode OLED may be initialized to a low level of the first voltage ELVDD. That is, the display device DD (refer to FIG. 1) having improved display quality may be provided.

Figure 5B:
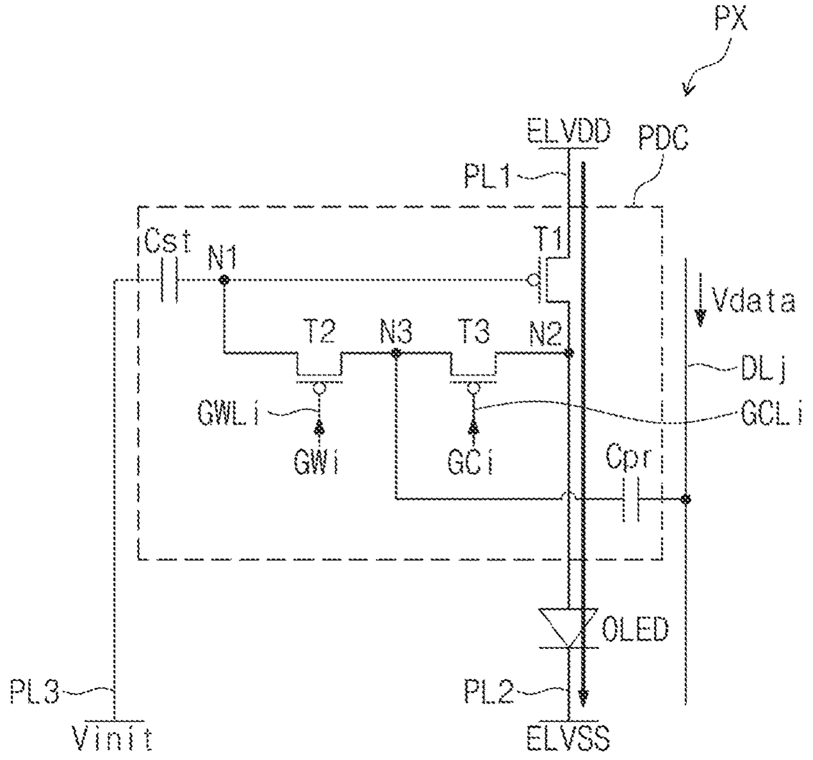

FIG. 5B is a diagram for describing an operation of the pixel PX in the second period P2.

Referring to FIGS. 4 and 5B, the first voltage ELVDD and the second voltage ELVSS may be at an active level in the second period P2. An active level of the first voltage ELVDD may be a high level. An active level of the second voltage ELVSS may be a low level.

The first scan signal GWi, the second scan signal GCi, and the data voltage Vdata may have an inactive level. An inactive level of the first scan signal GWi may be ahigh level. An inactive level of the second scan signal GCi may be a high level. An inactive level of the data voltage Vdata may be a high level.

A forward voltage may be applied to the light-emitting diode OLED by the first voltage ELVDD and the second voltage ELVSS. The amount of driving current flowing through the first transistor T1 may be determined based on the voltage stored in the first capacitor Cst. Based on the driving current, the light-emitting diode OLED may emit light.

The second voltage ELVSS may repeat a high level and a low level having a voltage level different from the high level at predetermined periods. A period in which the second voltage ELVSS is at the high level may be also referred to as a non-emission period. That is, the first period P1, the third period P3, and the fourth period P4 may be also referred to as non-emission periods. A period in which the second voltage ELVSS is at the high level may be also referred to as an emission period. That is, the second period P2 may be also referred to as an emission period. This will be described later.

According to the disclosure, the pixel PX may control light emission of the light-emitting diode OLED through the second voltage ELVSS. An additional configuration for controlling light emission may not be desired in the pixel PX. An area occupied by the pixel circuit PDC may be reduced. The area of the peripheral area NA (refer to FIG. 1) may be reduced. As a result, a large number of pixels PX may be disposed per predetermined area. That is, the display device DD (refer to FIG. 1) capable of implementing a high resolution may be provided.

The second period P2 may be also referred to as the emission period.

Figure 5C:
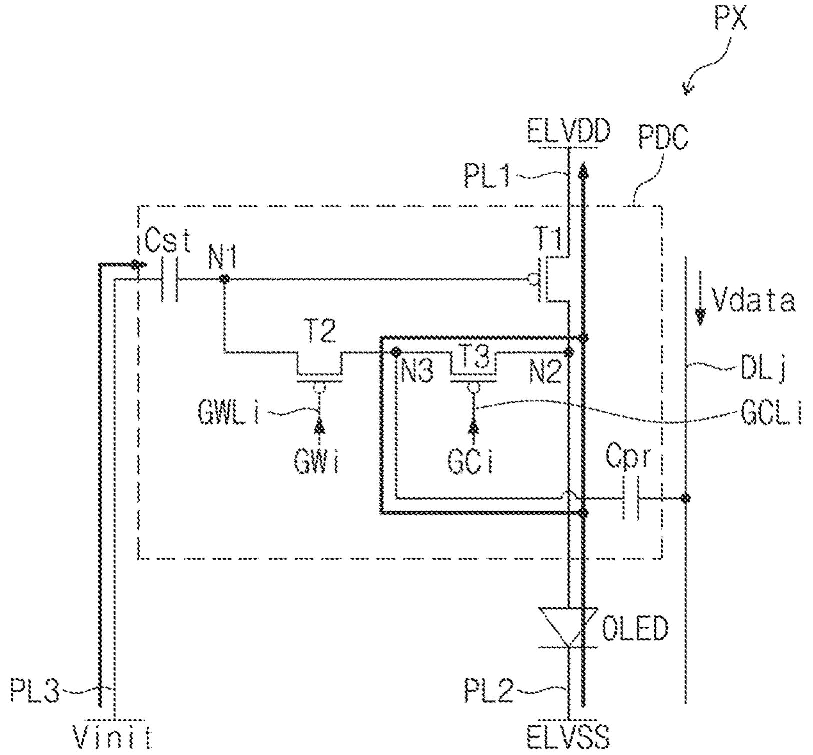

FIG. 5C is a diagram for describing an operation of the pixel PX in the third period P3.

Referring to FIGS. 4 and 5C, the initialization voltage Vinit, the second scan signal GCi, and the data voltage Vdata may be at active levels in the third period P3. An active level of the initialization voltage Vinit may be a low level. An active level of the second scan signal GCi may be a low level. An active level of the data voltage Vdata may be a low level. The third transistor T3 may be turned on.

The first voltage ELVDD, the second voltage ELVSS, and the first scan signal GWi may be at an inactive level. An inactive level of the first voltage ELVDD may be a low level. An inactive level of the second voltage ELVSS may be a high level.

The initialization voltage Vinit may change from a high level to a low level. While a voltage of the first node N1 capacitively coupled through the initialization voltage line PL3 and the first capacitor Cst falls, the first transistor T1 may be turned on.

The second voltage ELVSS may be a high level, and the first voltage ELVDD may be a low level. The light-emitting diode OLED may not emit light. A capacitor of the light-emitting diode OLED may be initialized to a low level of the first voltage ELVDD.

The second capacitor Cpr may be initialized to a low level of the first voltage ELVDD through the second node N2 and the third transistor T3.

According to the disclosure, the initialization voltage Vinit may be repeated at the active level several times during the third period P3. The first transistor T1 is repeatedly turned on to repeat the initialization of the capacitor of the light-emitting diode OLED and the second capacitor Cpr, so that the influence of previously input data may be further reduced. Accordingly, the display device DD (refer to FIG. 1) having improved display quality may be provided.

The third period P3 may be also referred to as an initialization period.

Figure 5D:
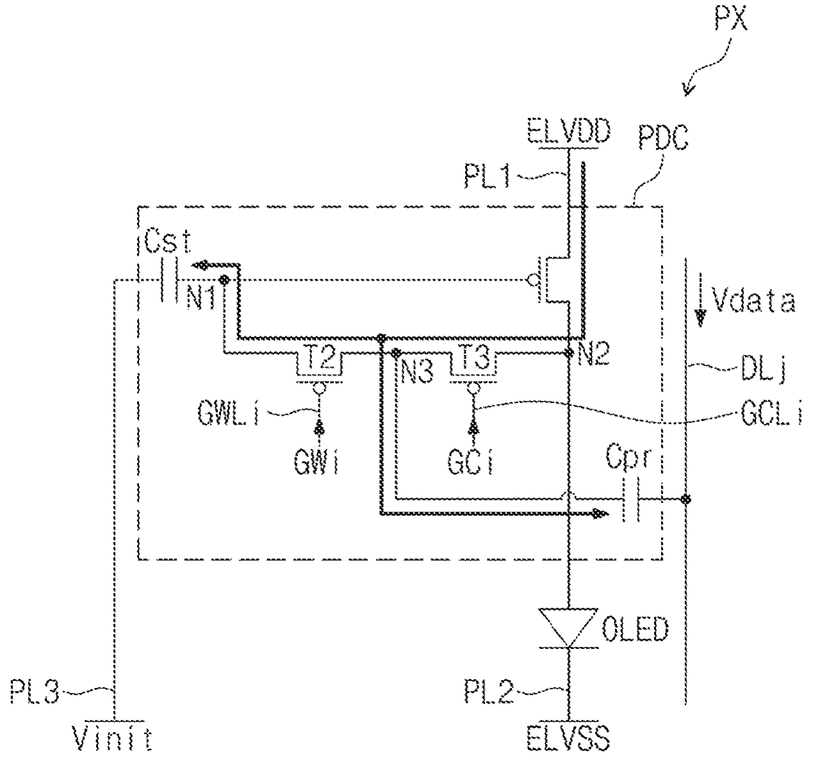

FIG. 5D is a diagram for describing an operation of the pixel PX in the fourth period P4.

Referring to FIGS. 4 and 5D, the first scan signal GWi, the second scan signal GCi, the first voltage ELVDD, and the data voltage Vdata are at active levels in the fourth period P4. Active levels of the first scan signal GWi and the second scan signal GCi may be low levels. An active level of the first voltage ELVDD may be a high level. An active level of the data voltage Vdata may be a low level.

The second transistor T2 and the third transistor T3 may be turned on.

The initialization voltage Vinit and the second voltage ELVSS may be at an inactive level. An inactive level of the initialization voltage Vinit may be a high level. An inactive level of the second voltage ELVSS may be a high level.

As the second and third transistors T2 and T3 are turned on, the first transistor T1 may operate as a source follower. That is, the first transistor T1 may be diode-connected.

A voltage obtained by adding a threshold voltage Vth of the first transistor T1 to a high level of the first voltage ELVDD may be applied to the first node N1. In this case, a value of the threshold voltage of the first transistor T1 may be a negative number.

The fourth period P4 may be also referred to as a compensation period.

The current flowing through the light-emitting diode OLED in the second period P2 may be proportional to $(Vgs-Vth)^2$, which is a square of a difference between the gate-source voltage (also referred to as Vgs) of the first transistor T1 and the threshold voltage of the first transistor T1.

As the voltage obtained by adding the threshold voltage Vth of the first transistor T1 to the high level of the first voltage ELVDD is applied to the first node N1 by the fourth period P4, the current flowing through the light-emitting diode OLED in the second period P2 may be proportional to the square of the difference between the high level of the first voltage ELVDD and the data voltage Vdata depending on offsetting the threshold voltage.

According to the disclosure, the threshold voltage of the first transistor T1 may not affect the current flowing through the light-emitting diode OLED by the fourth period P4. Each threshold voltage Vth of the first transistor T1 included in each of the pixels PX may be different according to the characteristics of the first transistor T1. However, regardless of the characteristics of the first transistor T1 included in each of the pixels PX, the current flowing through the light-emitting diode OLED in the second period P2 thereafter may be uniform. That is, the current flowing through the light-emitting diode OLED may be proportional to the square of the difference between the high level of the first voltage ELVDD and the data voltage Vdata. Accordingly, the pixel PX and the display device DD (refer to FIG. 1) having improved display quality may be provided.

Figure 6:
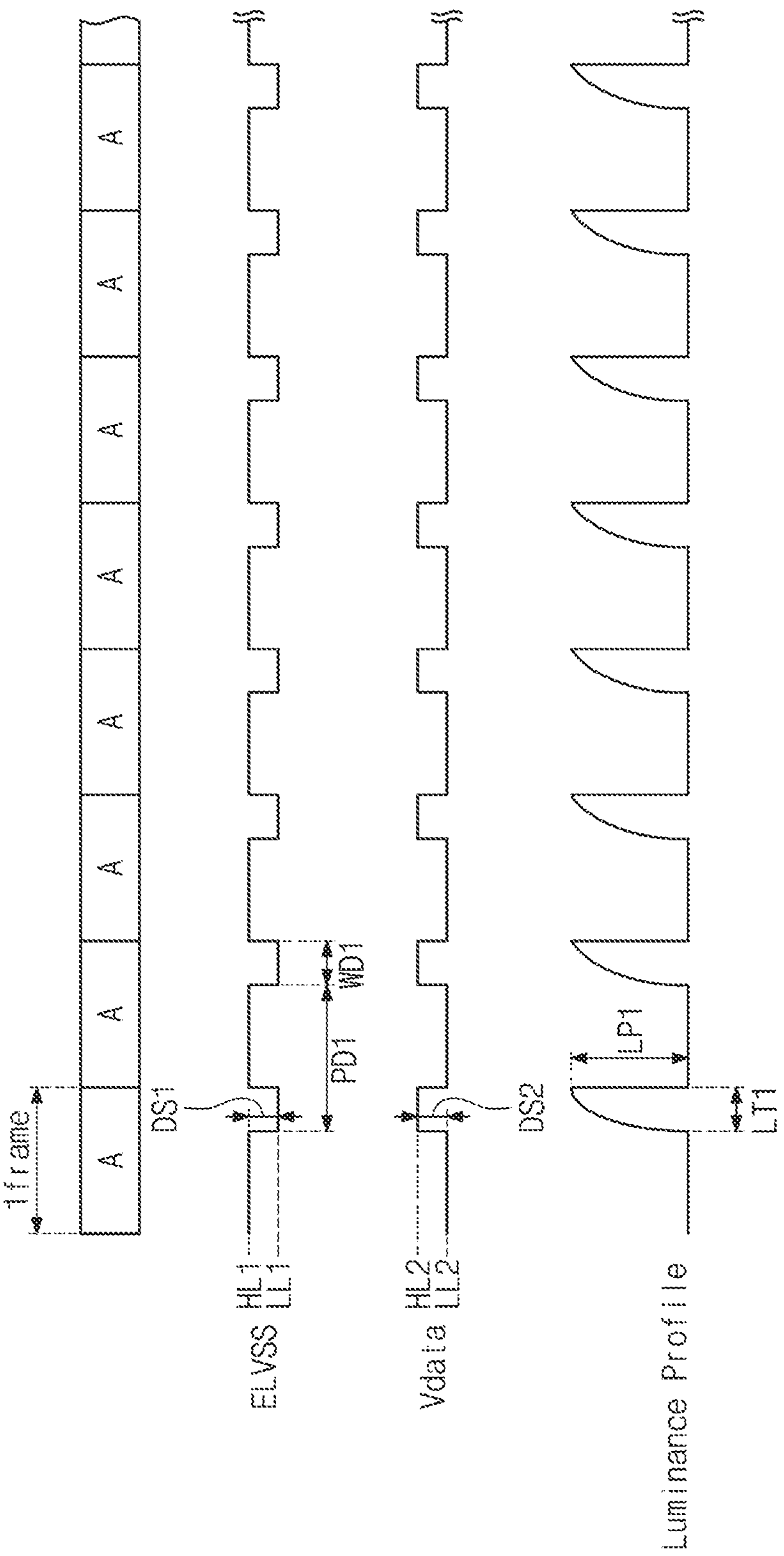
FIGS. 6 and 7 are diagrams illustrating an embodiment of an operation of a display device according to the disclosure.
Figure 7:
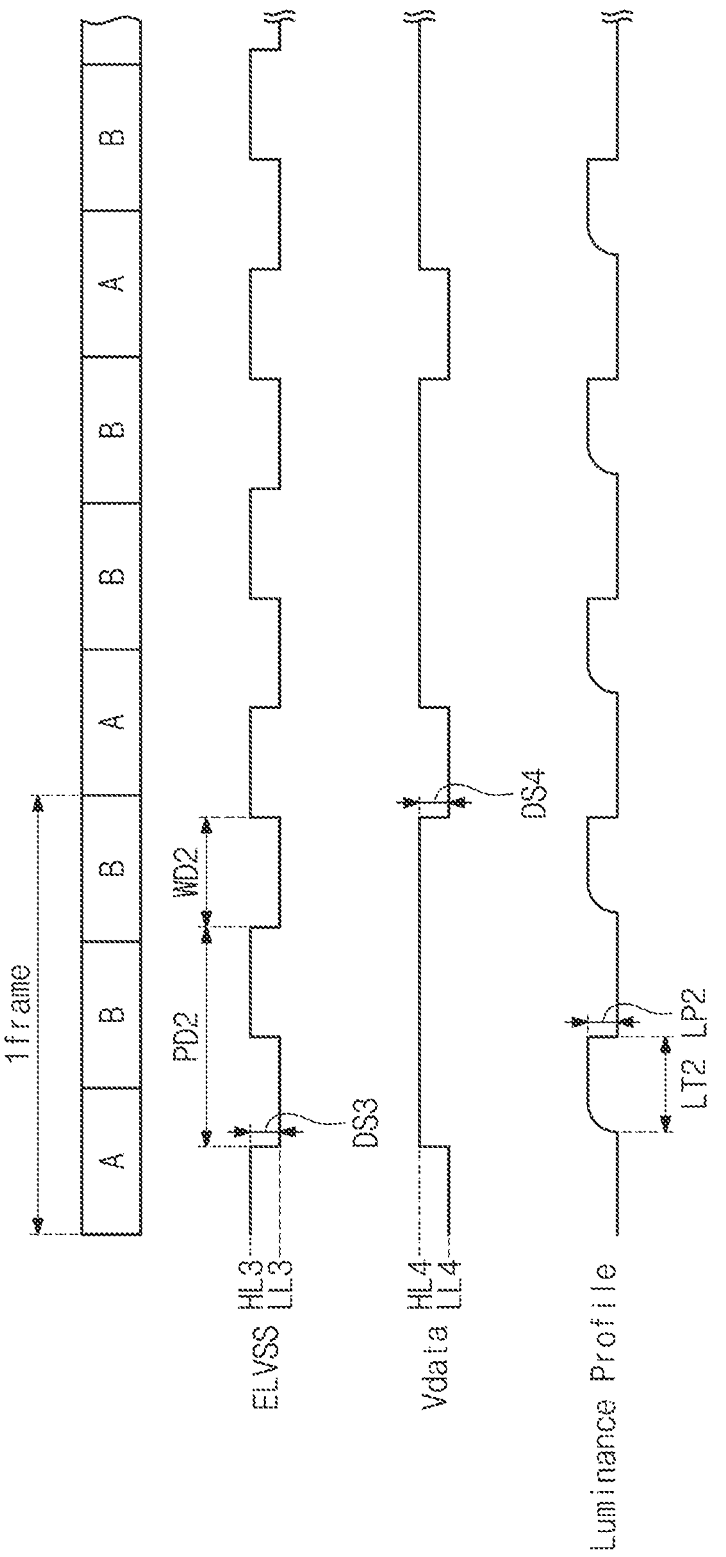

FIG. 6 and FIG. 7 are diagrams illustrating an embodiment of an operation of a display device according to the disclosure.

Referring to FIGS. 4, 6, and 7, the display device DD (refer to FIG. 1) may operate in a driving period A and a scan period B. The display device DD (refer to FIG. 1) may control the driving frequency of the display panel DP (refer to FIG. 2) by repeating the scan period B. The display device DD (refer to FIG. 1) may synchronize a frame generation of a graphics processing unit included in the display device DD (refer to FIG. 1) with a frame output timing of the display panel DP (refer to FIG. 2). That is, the display panel DP (refer to FIG. 2) may operate at a variable frequency. In this case, the display panel DP (refer to FIG. 2) may be also referred to as operating in a variable frequency mode. In an embodiment, power consumption of the display device DD (refer to FIG. 1) may be reduced by lowering the operating frequency of the display device DD (refer to FIG. 1) in a predetermined operating environment such as displaying a still image, for example.

Each of the driving period A and the scan period B may be a period having a time of about 8.4 milliseconds (ms). That is, each of the driving period A and the scan period B may have a frequency of about 120 Hertz (Hz). However, this is an example and the time of each of the driving period A and the scan period B in an embodiment of the disclosure is not limited thereto, for example, each time of the driving period A and the scan period B is not limited thereto. In an embodiment, each of the driving period A and the scan period B may be a period having a time of about 4.2 ms, for example.

When the graphics processing unit generates a frame having a refresh rate of about 120 Hz, the driving controller T-CON (refer to FIG. 2) allows the display panel DP (refer to FIG. 2) to operate at a frequency of about 120 Hz by controlling the driving period A to be driven only once per frame.

When the graphics processing unit generates a frame having a refresh rate of about 40 Hz, the driving controller T-CON (refer to FIG. 2) allows the display panel (DP, refer to FIG. 2) to operate at a frequency of about 40 Hz by controlling one driving period A and two scan periods B to be driven per frame. In an embodiment, the driving controller T-CON (refer to FIG. 2) controls the ratio of the driving period A to the scan period B such that the display panel DP (refer to FIG. 2) operates at various frequencies, for example.

FIG. 6 illustrates a driving of the display device DD (refer to FIG. 1) driven at a first driving frequency. In an embodiment, the first driving frequency may be about 120 Hz, for example.

The second voltage ELVSS may have a high level HL1 and a low level LL1 having a different voltage level from the high level HL1, which may be repeated at predetermined periods. A period in which the second voltage ELVSS is at the low level LL1 may be also referred to as an emission period. A period in which the second voltage ELVSS is at the high level HL1 may be also referred to as a non-emission period.

The low level LL1 may be less than the voltage level of a high level of the first voltage ELVDD. When the low level LL1 is provided to the second voltage ELVSS, a forward voltage may be applied to the light-emitting diode OLED. The light-emitting diode OLED may emit light depending on an amount of driving current according to the amount of voltage stored in the first capacitor Cst.

The high level HL1 may be greater than or equal to a voltage level of a low level of the first voltage ELVDD. When the high level HL1 is provided to the second voltage ELVSS, a reverse voltage may be applied to the light-emitting diode OLED. The light-emitting diode OLED may not emit light regardless of the amount of voltage stored in the first capacitor Cst.

The voltage controller PIC (refer to FIG. 2) may provide the second voltage ELVSS to be repeated at a first period PD1 in a frame operating at the first driving frequency.

In a frame operating at the first driving frequency, a period in which the low level LL1 of the second voltage ELVSS is provided may have a first width WD1. The first width WD1 may be the same as a duration of the emission period.

The second voltage ELVSS may have a first height DS1 between the high level HL1 and the low level LL1.

In a frame operating at the first driving frequency, a high level HL2 and a low level LL2 having a voltage level different from the high level HL2 of the data voltage Vdata may be repeated at predetermined periods. The data voltage Vdata may have a second height DS2 between the high level HL2 and the low level LL2.

During the emission period in a frame operating at the first driving frequency, the light-emitting diode OLED may emit light with a first luminance LP1 for a first emission time LT1.

FIG. 7 illustrates a driving of the display device DD (refer to FIG. 1) driven at a second driving frequency. The second driving frequency may have a different frequency from the first driving frequency. The second driving frequency may have a lower frequency than the first driving frequency. In an embodiment, the second driving frequency may be about 40 Hz (hertz), for example.

The second voltage ELVSS may have a high level HL3 and a low level LL3 having a different voltage level from the high level HL3, which may be repeated at predetermined periods. A period in which the second voltage ELVSS is at the low level LL3 may be also referred to as the emission period. A period in which the second voltage ELVSS is at the high level HL3 may be also referred to as the non-emission period.

The low level LL3 may be less than the voltage level of a high level of the first voltage ELVDD. When the low level LL3 is provided to the second voltage ELVSS, a forward voltage may be applied to the light-emitting diode OLED. The light-emitting diode OLED may emit light depending on an amount of driving current according to the amount of voltage stored in the first capacitor Cst.

The high level HL3 may be greater than or equal to a voltage level of a low level of the first voltage ELVDD. When the high level HL3 is provided to the second voltage ELVSS, a reverse voltage may be applied to the light-emitting diode OLED. The light-emitting diode OLED may not emit light regardless of the amount of voltage stored in the first capacitor Cst. The high level HL3 may have the same level as the high level HL1 of the second voltage ELVSS in a frame operating at the first driving frequency.

The voltage controller PIC (refer to FIG. 2) may provide the second voltage ELVSS to be repeated at a second period PD2 in a frame operating at the second driving frequency. The second period PD2 may have a longer width than the first period PD1 of the second voltage ELVSS provided in a frame operating at the first driving frequency.

When the second driving frequency is 1/n times the first driving frequency, the low level LL3 of the second voltage ELVSS may be repeated as many natural numbers as n−1 or less during a frame driven at the second driving frequency. In an embodiment, when the first driving frequency is about 120 Hz and the second driving frequency is about 40 Hz, the second voltage ELVSS may be repeated once during a frame in which the first driving frequency is provided, and the second voltage ELVSS may be repeated twice or once during a frame in which the second driving frequency is provided, for example. In an alternative embodiment, when the first driving frequency is about 120 Hz and the second driving frequency is about 30 Hz, the second voltage ELVSS may be repeated once during a frame in which the first driving frequency is provided, and the second voltage ELVSS may be repeated three times, twice, or once during a frame in which the second driving frequency is provided.

According to the disclosure, the voltage controller PIC (refer to FIG. 2) may control the number of high level and low level swings of the second voltage ELVSS repeated during a frame according to a change in driving frequency. The number of swings may decrease during the same time in a frame having a relatively low driving frequency compared to a frame having a relatively high driving frequency. As the number of swings decreases, power consumed by the voltage controller PIC (refer to FIG. 2) may decrease. Accordingly, it is possible to provide the display device DD (refer to FIG. 1) with reduced power consumption.

In a frame operating at the second driving frequency, a period in which the low level LL3 of the second voltage ELVSS is provided may have a second width WD2. The second width WD2 may be the same as a duration of the emission period. The second width WD2 may be greater than the first width WD1.

The second voltage ELVSS may have a third height DS3 between the high level HL3 and the low level LL3.

In a frame operating at the second driving frequency, a high level HL4 and a low level LL4 having a voltage level different from the high level HL4 of the data voltage Vdata may be repeated at predetermined periods. The data voltage Vdata may have a fourth height DS4 between the high level HL4 and the low level LL4.

During the emission period in a frame operating at the second driving frequency, the light-emitting diode OLED may emit light with a second luminance LP2 for a second emission time LT2. The second emission time LT2 may be longer than the first emission time LT1. The second luminance LP2 may be lower than the first luminance LP1.

Unlike the disclosure, when frames operating at different driving frequencies have the same emission time, high luminance light is repeatedly emitted for a short emission time in frames operating at a relatively low driving frequency, resulting in a flicker phenomenon. However, according to the disclosure, the emission time may be controlled by controlling the period of the second voltage ELVSS in each of the frames operating at different driving frequencies. In an embodiment, the second period PD2 of the second voltage ELVSS provided in the frame operating at the second driving frequency may have a longer width than the first period PD1 of the second voltage ELVSS provided in the frame operating at the first driving frequency having a higher frequency than the second driving frequency. The second emission time LT2 may be longer than the first emission time LT1, for example. Accordingly, a flicker phenomenon may be improved. Accordingly, the display device DD (refer to FIG. 1) having improved display quality may be provided.

In an embodiment of the disclosure, the low level LL3 of the second voltage ELVSS in the frame in which the second driving frequency is provided may have a higher voltage level than the low level LL1 of the second voltage ELVSS in the frame in which the first driving frequency is provided.

In this case, the high level HL2 and the low level LL2 of the data voltage Vdata in the frame in which the first driving frequency is provided may be respectively the same as the high level HL4 and the low level LL4 of the data voltage Vdata in the frame in which the second driving frequency is provided.

The first height DS1 between the high level HL1 and the low level LL1 of the second voltage ELVSS in the frame in which the first driving frequency is provided may be greater than the third height DS3 between the high level HL3 and the low level LL3 of the second voltage ELVSS in the frame in which the second driving frequency is provided.

Due to this, when the same amount of voltage is stored in the first capacitor Cst, the voltage applied to the light-emitting diode OLED in the frame in which the second driving frequency is provided may be less than the voltage applied to the light-emitting diode OLED in the frame in which the first driving frequency is provided. Accordingly, the second luminance LP2 may be lower than the first luminance LP1.

According to the disclosure, a user may perceive the total sum of luminance during the emission time as brightness. In a frame operating at the first driving frequency, the light-emitting diode OLED may emit light with the first luminance LPT during the first emission time LT1. In a frame operating at the second driving frequency, the light-emitting diode OLED may emit light with the second luminance LP2 during the second emission time LT2. The brightness perceived by the user in each of the frame operating at the first driving frequency and the frame operating at the second driving frequency may be the same. Accordingly, the display device DD (refer to FIG. 1) having improved display quality may be provided.

In an alternative embodiment according to the disclosure, the second height DS2 between the high level HL2 and the low level LL2 of the data voltage Vdata in the frame in which the first driving frequency is provided may be greater than the fourth height DS4 between the high level HL4 and the low level LL4 of the data voltage Vdata in the frame in which the second driving frequency is provided.

In this case, the high level HL1 and low level LL1 of the second voltage ELVSS in the frame in which the first driving frequency is provided may be respectively the same as the high level HL3 and the low level LL3 of the second voltage ELVSS in the frame in which the second driving frequency is provided.

Due to this, when the same amount of voltage is stored in the first capacitor Cst, the voltage applied to the light-emitting diode OLED in the frame in which the second driving frequency is provided may be less than the voltage applied to the light-emitting diode OLED in the frame in which the first driving frequency is provided. The second luminance LP2 may be lower than the first luminance LPT.

According to the disclosure, a user may perceive the total sum of luminance during the emission time as brightness. In a frame operating at the first driving frequency, the light-emitting diode OLED may emit light with the first luminance LPT during the first emission time LT1. In a frame operating at the second driving frequency, the light-emitting diode OLED may emit light with the second luminance LP2 during the second emission time LT2. The brightness perceived by the user in each of the frame operating at the first driving frequency and the frame operating at the second driving frequency may be the same. Accordingly, the display device DD (refer to FIG. 1) having improved display quality may be provided.

In an embodiment of the disclosure, an emission time may be controlled by controlling a period in which a high level and a low level of a second voltage are provided in each of the frames operating at different driving frequencies. In an embodiment, a second period of the second voltage provided in the frame operating at the second driving frequency may have a width longer than a first period of the second voltage provided in the frame operating at the first driving frequency having a higher frequency than the second driving frequency, for example. A second emission time may be longer than a first emission time. Accordingly, a flicker phenomenon may be improved. Accordingly, a display device having improved display quality may be provided.

As described above, the voltage controller may control the number of high level

What is claimed is:

1. A display device comprising:
- a display panel which includes a plurality of pixels and displays an image in each of a plurality of frames;
- a driving controller which drives the plurality of frames with a plurality of driving frequencies, respectively; and
- a voltage controller which provides a first voltage, a high level, and a second voltage in which a low level having a voltage level different from the high level is repeated at a predetermined period to the display panel,
- wherein the driving controller drives one of the plurality of frames with a first driving frequency and drives another one of the plurality of frames with a second driving frequency having a different frequency from the first driving frequency, and
- wherein the voltage controller provides the second voltage to be repeated in a first period in the one of the plurality of frames, and provides the second voltage to be repeated in a second period having a longer width than a width of the first period in the another one of the plurality of frames, and
- wherein, when the second driving frequency is 1/n times the first driving frequency, the low level of the second voltage is repeated by a natural number of n−1 or less during a frame driven at the second driving frequency.

2. The display device of claim 1, wherein each of the plurality of pixels includes:
- a first transistor including a gate electrode connected to a first node, a first electrode connected to a first voltage line to which the first voltage is provided, and a second electrode connected to a second node;
- a second transistor including a gate electrode connected to a first scan line, a first electrode connected to the first node, and a second electrode connected to a third node;
- a first capacitor connected between the first node and an initialization voltage line;
- a third transistor including a gate electrode connected to a second scan line, a first electrode connected to the third node, and a second electrode connected to the second node;
- a second capacitor connected between the third node and a data line; and a light-emitting diode including a first electrode connected to the second node and a second electrode connected to a second voltage line to which the second voltage is provided.

3. The display device of claim 2, wherein a first luminance of light emitted from the light-emitting diode in the one of the plurality of frames is higher than a second luminance of light emitted from the light-emitting diode in the another one of the plurality of frames.

4. The display device of claim 2, wherein a first emission time of light emitted from the light-emitting diode in the one of the plurality of frames is shorter than a second emission time of light emitted from the light-emitting diode in the another one of the plurality of frames.

5. The display device of claim 1, wherein the first driving frequency is higher than the second driving frequency.

6. The display device of claim 1, further comprising:

a data driver electrically connected to the display panel, and wherein the display panel further includes a plurality of data lines respectively connected to the plurality of pixels, and wherein the data driver simultaneously provides data voltages generated in units of pixel rows to the plurality of pixels through the plurality of data lines.

7. The display device of claim 6, wherein a first height between a high level and a low level of a data voltage of the data voltages provided to the one of the plurality of frames is greater than a second height between the high level and the low level of the data voltage provided to the another one of the plurality of frames.

8. The display device of claim 1, wherein the high level is equal to or greater than a voltage level of a low level of the first voltage.

9. The display device of claim 1, wherein the low level is less than a voltage level of a high level of the first voltage.

10. The display device of claim 1, wherein a first height between the high level and the low level of the second voltage in the one of the plurality of frames is greater than a second height between the high level and the low level of the second voltage in the another one of the plurality of frames.

11. The display device of claim 10, wherein a first voltage level of the low level of the second voltage in the one of the plurality of frames is less than a second voltage level of the low level of the second voltage in the another one of the plurality of frames.

12. The display device of claim 1, wherein a first width of a period in which the low level of the second voltage is provided in the one of the plurality of frames is less than a second width of a period in which the low level of the second voltage is provided in the another one of the plurality of frames.

13. A display device comprising:

a display panel including a plurality of pixels, each of the plurality of pixels including:

a first transistor including a gate electrode connected to a first node, a first electrode connected to a first voltage line to which a first voltage is provided, and a second electrode connected to a second node;

a second transistor including a gate electrode connected to a first scan line, a first electrode connected to the first node, and a second electrode connected to a third node;

a first capacitor connected between the first node and an initialization voltage line;

a third transistor including a gate electrode connected to a second scan line, a first electrode connected to the third node, and a second electrode connected to the second node;

a second capacitor connected between the third node and a data line; and a light-emitting diode including a first electrode connected to the second node and a second electrode connected to a second voltage line to which a second voltage in which a high level and a low level having a voltage level different from the high level are repeated in a predetermined period is provided, wherein the display panel displays an image in each of a plurality of frames respectively driven at a plurality of driving frequencies, and wherein the second voltage is provided such that a high level and a low level are repeated in a first period in a first frame operating at a first driving frequency among the plurality of frames, and is provided such that the high level and the low level are repeated in a second period having a longer width than the first period in a second frame operating at a second driving frequency lower than the first driving frequency among the plurality of frames.

14. The display device of claim 13, wherein a first luminance of light emitted from the light-emitting diode in the first frame is higher than a second luminance of light emitted from the light-emitting diode in the second frame.

15. The display device of claim 13, wherein a first emission time of light emitted from the light-emitting diode in the first frame may be shorter than a second emission time of light emitted from the light-emitting diode in the second frame.

16. The display device of claim 13, wherein a first height between the high level and the low level of the second voltage in the first frame is greater than a second height between the high level and the low level of the second voltage in the second frame.

17. The display device of claim 13, wherein a first voltage level of the low level of the second voltage in the first frame is less than a second voltage level of the low level of the second voltage in the second frame.

18. The display device of claim 13, wherein a first width of a period in which the low level of the second voltage is provided in the first frame is less than a second width of a period in which the low level of the second voltage is provided in the second frame.

19. The display device of claim 13, wherein, when the second driving frequency is 1/n times the first driving frequency, the low level of the second voltage is repeated by a natural number of n−1 or less during the second frame.

* * * * *